United States Patent [19]
Pierro

[11] Patent Number: 5,869,112
[45] Date of Patent: Feb. 9, 1999

[54] APPARATUS FOR MANUFACTURING INJECTION MOLDED PARTS

[75] Inventor: Helmut Pierro, Offenau, Germany

[73] Assignee: August Laepple GmbH & co. K.G., Heilbronn, Germany

[21] Appl. No.: 900,059

[22] Filed: Jul. 24, 1997

Related U.S. Application Data

[63] Continuation of Ser. No. 525,984, Sep. 8, 1995, abandoned.

[30] Foreign Application Priority Data

Sep. 9, 1994 [DE] Germany ........................... 44 32 163.5

[51] Int. Cl.$^6$ .................................................. B29C 45/64
[52] U.S. Cl. .......................................... 425/589; 425/593
[58] Field of Search .................................. 425/556, 589, 425/593, DIG. 58

[56] References Cited

U.S. PATENT DOCUMENTS 4,202,522  5/1980  Hanas et al. ............................. 425/185
4,854,849  8/1989  Sudo ................................. 425/DIG. 58
5,123,834  6/1992  Joyner ..................................... 425/593

OTHER PUBLICATIONS

Mold–Making Handbook for The Plastics Engineer, p. 288, 1983.

Julius Grant, Hackh's Chemical Dictionary, p. 306, 1969.

*Primary Examiner*—Tim Heitbrink
*Attorney, Agent, or Firm*—Townsend and Townsend and Crew

[57] ABSTRACT

An apparatus for manufacturing injection molded parts is described with a die and a counter-die and a mold cavity formed therebetween. Both the die and also the counter-die respectively consist of a mold insert which provides the contours and a web-braced body of cast material which receives the respective mold insert in a form-fitted manner, surrounds it and supports it against the injection molding forces which arise.

8 Claims, 3 Drawing Sheets

APPARATUS FOR MANUFACTURING INJECTION MOLDED PARTS

This is a Continuation of application Ser. No. 08/525,984 filed Sep. 8, 1995, now abandoned.

DESCRIPTION

The invention relates to an apparatus for manufacturing injection molded parts, in particular of large area plastic molded parts, the apparatus comprising a die and a counter-die which can be clamped against one another between a machine side clamping surface and an arrangement which exerts a pressure and which thereby bound a hollow cavity corresponding to the respective molded part into which a high pressure supply for the injection molded material opens.

BACKGROUND OF THE INVENTION

Such pieces of apparatus, which can be termed injection molding tools, are known and are used in practice in diverse manners. These are frequently large tools such as are for example used for the manufacturing of components of motor vehicles, for example bumpers (fenders), areal cladding elements, dashboard units and the like.

The known apparatuses of this kind, which are exposed to very high static and dynamic loadings, which can arise as a result of the internal pressures of up to 1000 bar during the injection molding processes, are milled out of fully forged material.

In this manner one can indeed obtain systems which are fit for operation but many disadvantages must be tolerated which are above all to be seen in the high manufacturing costs, the exceptionally long time interval which is required for manufacturing, the high weight of the systems and the fact that additional functions which are necessary for handling and operation must be realized by additional separate units which then have to be bolted to the respective base body. This applies for example with respect to transport elements and guide elements. Additional, complex, machining processes are necessary in order to introduce the required apertures and windows into the respective base body.

SUMMARY OF THE INVENTION

It is the object of the invention to improve an apparatus of the initially named kind both with respect to manufacturing and also with respect to the operation and handling thereof and also with respect to the static and dynamic load carrying ability.

This object is satisfied in accordance with the invention essentially in that both the die and also the counter-die each consist of a mold insert which provides the contour and a web-braced or ribbed body of cast material in particular of a cast metal, which accommodates the respective mold insert in form-fitted manner and supports it against the injection molding pressure forces which arise.

It is accordingly important for the invention that, in a departure from the previously known complex solid construction which can only be realized with time consuming milling processes, mold inserts are combined with web-braced bodies of cast material which receive them in form-fitted manner and surround them while supporting them. The mold inserts preferably only have to be formed as self stable bodies which ensure dimensional accuracy during machining, installation and dismantling. The web-braced bodies which surround the mold insert bear practically the entire static and dynamic loadings as a result of their design as cast bodies and are capable of being simply designed and manufactured in a manner specific to the loading.

In the case of large tools a reduction of the manufacturing time by several months can be achieved in comparison to the solid form of construction and it is of quite essential importance that through the combination of the contour giving mold inserts with the web-braced bodies which surround them, a substantial degree of freedom is provided with respect to the design possibilities having regard to the functionality and stability with ideal exploitation of the material which is to be used.

The cast web-braced bodies preferably respectively comprise an inner envelope part for the form-fitted reception of the respectively associated mold insert and of a plurality of mutually spaced apart belt elements which extend in the peripheral direction and also of connecting webs which extend between the belt elements and which are likewise integrally formed with the envelope part.

These integrally formed web-braced bodies can be so designed with respect to the static and dynamic loadings that are expected, through choice of the mutual spacings and/or of the cross-sectional dimensions of the belt elements and/or of the connection webs, that a stability is achieved with ideal exploitation of the material used which is so high that, despite the considerable weight saving in comparison to the solid manner of construction, no disturbing movements leading to fatigue effects arise in operation, which also signifies that fewer effects of wear can occur due to frictional processes at high pressure.

The web-braced body consisting of cast material has, as a result of its structure, a large outer surface and ensures thereby good thermal dissipation. This, in conjunction with the selected cast material, which preferably contains graphite and is thus of poor thermal coductivity, leads to a situation in which the outer temperature of the apparatus remains at approximately room temperature, despite the temperature in the mold cavity which, for example, amounts to approximately 70° C.

Through the weight saving which can be achieved as a result of the use of cast web-braced bodies only smaller masses have to be moved in the factory, which not only leads to energy savings but also to protection and more considerate treatment of the guides which are used.

Through the separation, and thus also the separate manufacture of web-braced bodies and mold inserts a parallel manufacture of these components is possible with a corresponding time saving. Moreover, as a result of the subdivision which is effected the accessibility of the components for the respectively required machining processes is improved.

It is also possible to design the web-braced bodies in practice as standard units for receiving form-fitted mold units which define different mold cavities. This can in particular be considered when the static and dynamic loadings which arise during the injection molding process are similar for the different mold units and can thus be born in ideal manner in each case by the web-braced bodies.

Further important advantages of the invention result from the fact that during casting of the respective web-braced bodies a plurality of additional functions can be achieved without practically any further effort. Thus it is possible, by the freecasting of apertures for all supply lines and viewing windows, to avoid the previously necessary, complicated machining processes in the solid body. Moreover, it is possible, for example by the freecasting of contact surfaces, to ensure that lower thermal transmission effects arise and that no disturbing thermal transfer to the machine and the environment takes place. This can be achieved without the use of thermal insulation panels and in this connection the cooling body structure provided by the web-braced body design also has an advantageous effect.

Finally, it is a further substantial advantage that the manufacture of separate functional units which have to be bolted to the apparatus can in practice be avoided since functional elements, support bolts, transport elements, guide elements and the like can be directly cast together or formed with the web-braced body during the casting process. They are thus directly available and if necessary only need to be machined a little, with this machining being restricted to surface machining which causes little trouble.

BRIEF DESCRIPTION OF THE DRAWINGS

Further advantageous forms of the invention are set forth in the subordinate claims. An embodiment of the invention will now be described in the following with reference to the drawings; in the drawings there are shown:

DESCRIPTION OF THE PREFERRED EMBODIMENT

Figure 1:
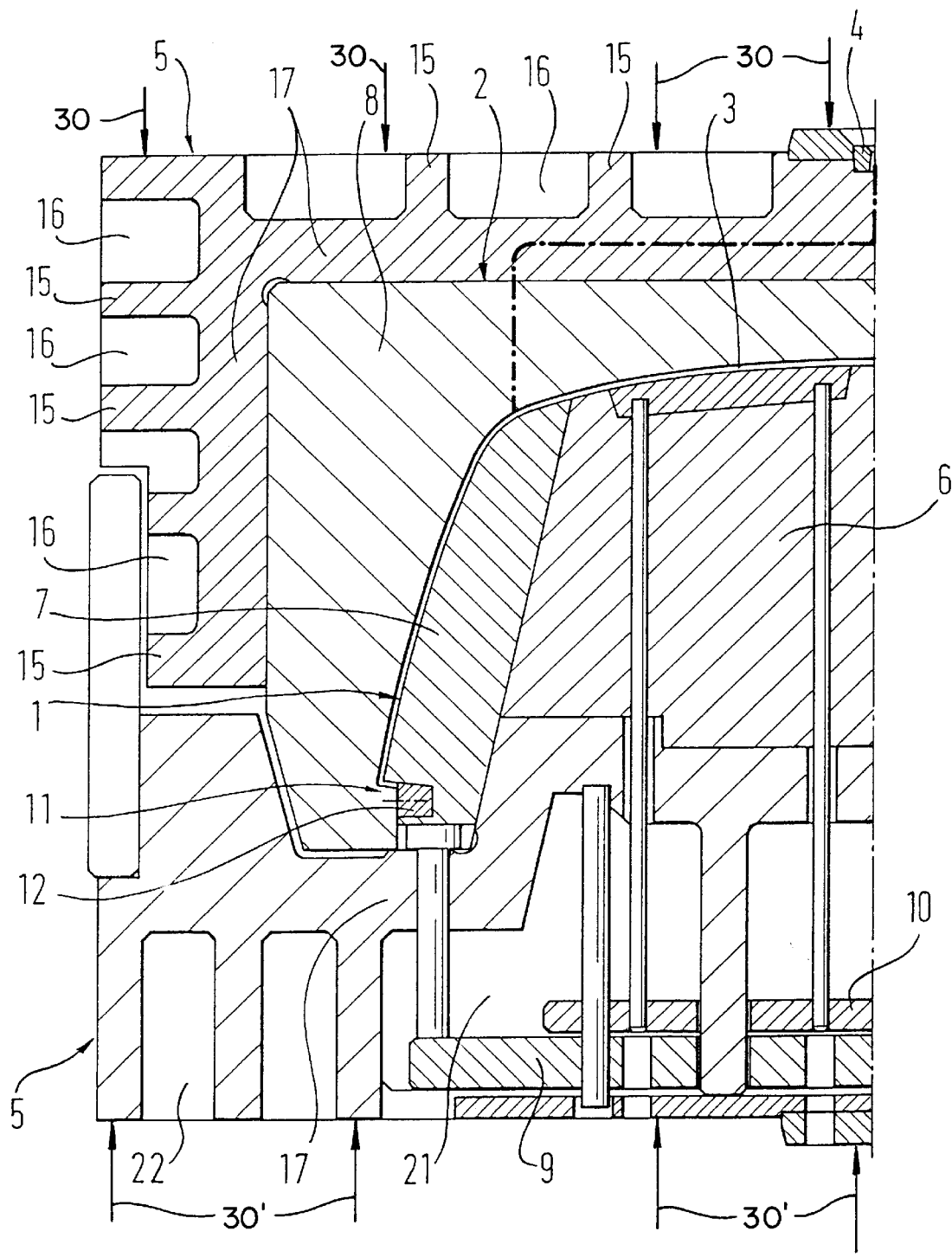
FIG. 1 is a schematic partial sectional illustration of an apparatus formed in accordance with the invention for manufacturing a plastic bumper for a motor vehicle.

The partial sectional illustration of FIG. 1 shows an apparatus for the manufacture of plastic injection molded parts in the closed state.

The apparatus includes a die 1 and a counter-die 2 which can be clamped against one another between a machine side clamping surface and a pressure exerting arrangement and thereby bound between them a hollow cavity 3 corresponding to the respective molded part. The clamping is schematically shown by arrows 30 and 30' at the respective top and bottom of the apparatus illustrated. The injection molded material can be introduced into this hollow cavity 3 at high pressure via at least one nozzle 4 and one or more supply lines.

The counter-die 2 consists of a mold insert 8 and a web-braced body 5 surrounding the latter. The die 1 is also formed by a mold insert 6, 7 and a web-braced body 5 associated therewith.

The mold insert of the die is formed in several parts in known manner to ensure the respectively required demolding and includes in particular an inner part 6 and also an outer part 7 which are movable relative to one another. The specific design of the multi-part die mold insert 6, 7 and also the members provided for mutual guidance and actuation are of a customary nature and do not therefore need to be explained in detail in the context of the invention, since the invention can be used with the most diverse designs of mold inserts.

It should, however, be mentioned that the units required to realize the requisite relative movements between the die 1 and the counter-die 2 and also for the movement of the mold insert parts, namely a main actuation plate 9 and a stripper or ejector actuation plate 10 can be accommodated in a correspondingly dimensioned recess 21 of the lower web-braced body. It is important that this recess 21 does not have to first be provided by complicated and expensive milling processes but can rather be achieved by the corresponding layout of the web-braced body 5 during the casting process.

In the closed position of the apparatus a formation of the mold insert 8 belonging to the counter-die 2 engages behind the outer part 7 of the mold insert belonging to the die 1, whereby a corresponding latched arrangement 11 is provided. This latched arrangement 11 is released after the injection molding process has taken place in that by means of suitable actuating units 13, which can be seen in FIG. 2, the outer part 7 of the mold insert of the die is lifted relative to the stationary inner part 6 and is thereby moved inwardly as a result of the inclined surface guide.

In FIG. 1 a stripper member 12 is also shown which is effective during the demolding process, it does not however have to be described in detail since it does not have any particular significance for the present invention and it could also be replaced by another corresponding unit.

The mold insert 8 of the counter-die 2 and also the mold inserts 6, 7 of the die 1 are respectively separately manufactured from the web-braced bodies 5 by corresponding milling processes. The dimensioning takes place in such a way that in each case a self stable unit, i.e. an inherently stable unit, is present which ensures dimensional accuracy during machining, installation and dismantling but which must not however be able to accommodate the high dynamic forces which arise during an injecting molding process. This function is satisfied by the respective web-braced body 5 into which the associated mold insert 8 or 6, 7 is fitted in form-fitted manner and which is provided and intended for this purpose.

The web-braced or ribbed body 5 consisting preferably of graphite containing cast material is respectively formed by an inwardly disposed envelope part 17 which serves to accommodate the associated mold insert 6, 7 or 8 respectively, and of belt elements 15 and connection webs 16 which are integrally formed with this envelope part 17.

The belt elements 15 thereby extend over the periphery of the apparatus and form closed holding rings or, if they only extend over the upper region of the web-braced body 5 correspondingly effective part rings.

The wall thickness of the respective envelope part 17 and also the position, the mutual spacing and/or the cross-sectional dimensions of the belt elements 15, and also of the connection webs 16 which extend perpendicular to the belt elements 15, are selected in dependence on the occurring static and dynamic loadings. The variations which are thereby possible make it possible to provide extremely stable structures while minimizing the usage of material and the weight.

Furthermore, it is no longer necessary, in comparison to the known solid form of construction, to provide separate support members and a separate base or machine plate, but rather all these components can be integrated into the respective web-braced body 5, that is to say in each case only a single unitary web-braced body is present, the integrated struts of which, in the form of the belt elements 15 and the connection webs 16, enable specific strength requirements to be met.

For further weight and material saving, cut-outs can also be provided in regions which are subjected to lower mechanical loads, such as are for example shown at 22 in FIG. 1.

Figure 2:
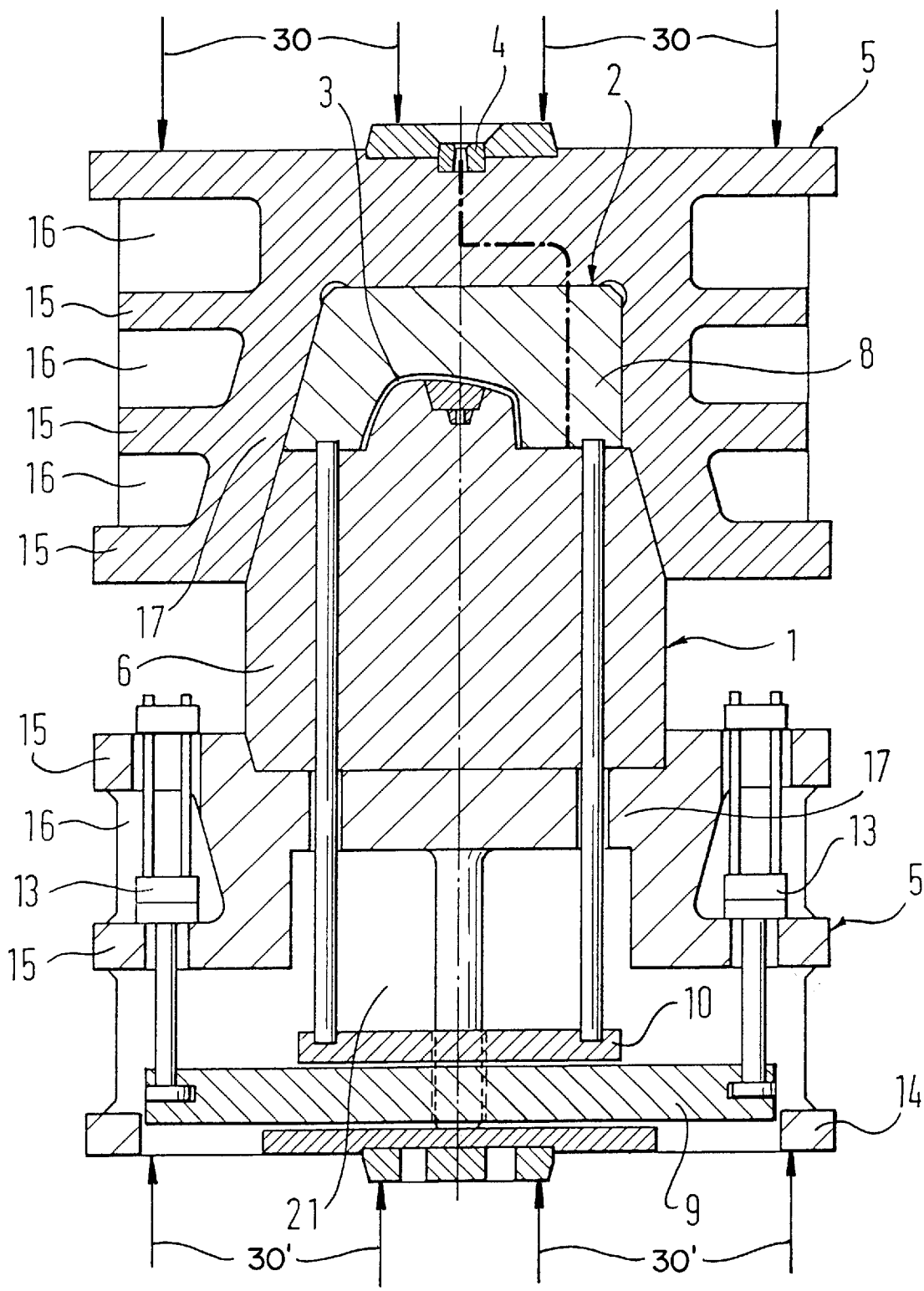
FIG. 2 is a sectional view of the apparatus of FIG. 1 in a plane perpendicular to the section of FIG. 1.

The sectional view of FIG. 2 in turn permits the form-fitted insertion of the mold inserts 6, 8 into the web-braced body 5 to be seen and shows also that these web-braced bodies have, as a result of the layout of the belt elements 15 and the connection webs 16, a large surface so that these web-braced bodies 5 also have a type of heat sink or radiator structure which has advantages in practical use.

The integrally formed machine plate 14 is machined at the surface at least in regions where it is clamped to the machine clamping plate, so that correspondingly suitable clamping surfaces are available.

Figure 3:
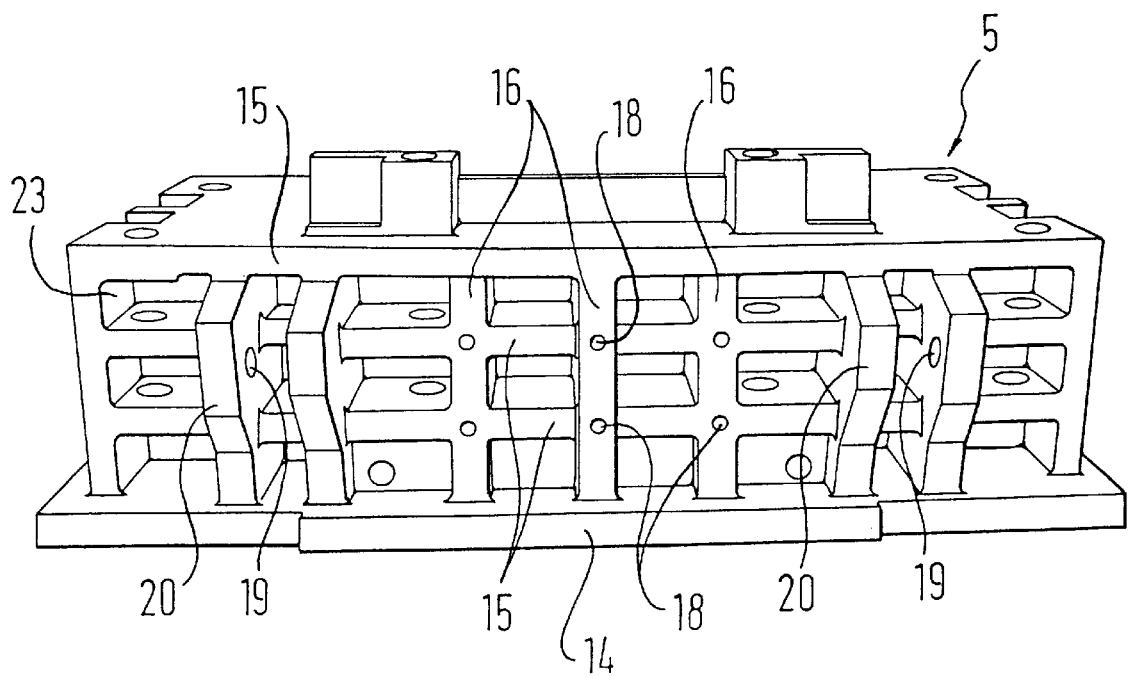
FIG. 3 is a perspective front view of the machine side web-braced body of this invention.

The perspective illustration of FIG. 3 shows the embodiment of a lower web-braced body 5. The hollow profile or frame structure provided by the belt elements 15 and the connection webs 16 which is ideally suited to bear high loads can be seen clearly.

It has already been mentioned that additional functions can be realized in a simple manner in the respective web-braced body 5, such as for example the integral molding of transport elements 20 with corresponding free cast openings 19 for receiving the coupling members for carrier systems.

Furthermore hydraulic bores and/or tempering bores 18 can be introduced into the web-braced body 5 with the impermeability of the material used for the provision of the web-braced body 5 being advantageous.

The machine plate 14 is likewise integrally molded and surface machined in specific regions to provide defined flat mounting or coupling surfaces.

Free cast openings can likewise be introduced into the belt elements 15 extending in the peripheral direction, such as is for example shown at 23 in the form of a cylindrical cut-out to receive guide column elements.

Reference numeral list 1 die
2 counter-die
3 hollow cavity
4 nozzle
5 web-braced body
6 inner part of the mold insert for the die
7 outer part of the mold insert for the die
8 mold insert for the counter-die
9 main actuation plate
10 injector actuation plate
11 latched arrangement
12 stripper member
13 actuating unit
14 machine plate
15 belt element
16 connection web
17 envelope part
18 bores
19 free cast opening
20 transport element
21 recess
22 free space
23 free casting

I claim:

1. Apparatus for manufacture of an injected molded part comprising in combination:

a first mold portion;

a second mold portion;

the first mold portion and the second mold portion cooperatively configured to be clamped against one another, the first mold portion and the second mold portion when clamped defining an interior cavity corresponding to a profile of the injected molded part;

the first mold portion and the second mold portion defining, respectively, a first mold portion exterior dimension for the first mold portion and a second mold portion exterior dimension for the second mold portion, these dimensions being larger than the profile of the injected molded part within the interior cavity;

means for introducing injected molded material into the interior cavity for formation of the injected molded part;

a first cast web and belt braced body defining a first mold portion receiving cavity for receiving the first mold portion at the first mold portion exterior dimension and clamping the first mold portion for contact with the second mold portion;

a second cast web and belt braced body defining a second mold portion receiving cavity for receiving the second mold portion at the second mold portion exterior dimension and clamping the second mold portion towards the first mold portion; and both the first cast web and belt braced body and the second cast web and belt braced body having a plurality of mutually spaced apart belt elements extending in a peripheral direction with connecting webs which extend between belt elements exterior to the first mold portion receiving cavity and the second mold portion receiving cavity for transmitting pressure during injection molding from the first cast web and belt braced body and the second cast web and belt braced body to the first mold portion and the second mold portion during injection molding;

at least one of the first cast web and belt braced body and second cast web and belt braced body defining apertures, the apertures being used for at least one of the functions consisting of supply lines, viewing windows, hydraulic bores, and tempering bores.

2. Apparatus for manufacture of an injected molded part according to claim 1 and wherein:

connecting elements are formed integrally with the belt elements.

3. Apparatus for manufacture of an injected molded part according to claim 1 and wherein:

the first mold portion and second mold portion are self-stable entities for ensuring the accurate dimension of the injected molded part; and the first cast web and belt braced body and the second cast web and belt braced body are dimensioned for applying pressure to the first mold portion and second mold portion without elastic deformation.

4. Apparatus for manufacture of an injected molded part according to claim 1 and wherein:

at least one of the first cast web and belt braced body and the second cast web and belt braced body are coupled to a machine mounting surface.

5. Apparatus for manufacture of an injected molded part according to claim 4 and wherein:

at least one of the first cast web and belt braced body or the second cast web and belt braced body include broadened webs adjacent to the machine mounting surface.

6. Apparatus for manufacture of an injected molded part according to claim 1 and wherein:

at least one of the first cast web and belt braced body and the second cast web and belt braced body have functional elements within them; these functional elements are selected from the group consisting of support bolts provided at the machine side, lateral transport elements, transport elements formed by enlargements of the connection webs, mold securing elements, clamping flanges, distribution blocks, guide elements, elements to receive guides, mold securing elements, distribution blocks, and elements provided to receive guides.

7. Apparatus for manufacture of an injected molded part according to claim 1 and wherein:

projected flat contact surfaces are formed in at least one of the first cast web and belt braced body and the second cast web and belt braced body.

8. Apparatus for manufacture of an injected molded part according to claim 1 and wherein:

at least one of the first cast web and belt braced body and the second cast web and belt braced body are graphite containing cast material.

* * * * *